United States Patent [19]
Kojima

[11] Patent Number: 5,276,550
[45] Date of Patent: Jan. 4, 1994

[54] OPTICAL MICROSCOPE WITH VARIABLE MAGNIFICATION

[75] Inventor: Jitsunari Kojima, Hachioji, Japan

[73] Assignee: Olympus Optical Co., Ltd., Tokyo, Japan

[21] Appl. No.: 685,183

[22] Filed: Apr. 15, 1991

[30] Foreign Application Priority Data

Apr. 16, 1990 [JP] Japan ................................. 2-97722

[51] Int. Cl.$^5$ .......................... G02B 21/00; G01J 1/20
[52] U.S. Cl. .................................... 359/368; 359/383; 250/201.4; 250/204
[58] Field of Search ............................ 359/368–; 382/41–; 250/201.3–; 340/700–

[56] References Cited

U.S. PATENT DOCUMENTS

| | | | |
|---|---|---|---|
| 4,617,682 | 10/1986 | Mori et al. | 382/28 |
| 4,643,540 | 2/1987 | Kawasaki et al. | 359/381 |
| 4,685,140 | 8/1987 | Mount, II | 382/65 |
| 4,725,720 | 2/1988 | Sawada et al. | 359/385 |
| 4,810,869 | 3/1989 | Yabe et al. | 250/201.3 |
| 5,033,103 | 7/1991 | Sillart | 382/65 |
| 5,038,035 | 8/1991 | Nishimura et al. | 359/368 |

FOREIGN PATENT DOCUMENTS

| | | |
|---|---|---|
| 0305644 | 3/1989 | European Pat. Off. |
| 038812 | 9/1990 | European Pat. Off. |
| 59-177507 | 10/1984 | Japan |
| 59-177508 | 10/1984 | Japan |
| 60-8816 | 1/1985 | Japan |
| 60-118827 | 6/1985 | Japan |
| 62-32244 | 2/1987 | Japan |
| 64-53157 | 3/1989 | Japan |

Primary Examiner—Bruce Y. Arnold
Assistant Examiner—Thong Nguyen
Attorney, Agent, or Firm—Stevens, Davis, Miller & Mosher

[57] ABSTRACT

An optical microscope including a revolver for mounting a plurality of objective lenses having different magnifications, a stage for holding a specimen to be inspected and being movable in a plane perpendicular to an inspection optical axis, a television camera for picking-up an image of the specimen by means of an objective lens which is indexed into the inspection optical axis, and a television monitor for displaying an image of the specimen on a display screen. In order to select an objective lens having a desired magnification and to move the stage with respect to the inspection optical axis automatically, a desired region is denoted on the image displayed on the display screen by operating a mouse. Then, a necessary magnification is calculated in accordance with a division ratio obtained by dividing an area of the desired region by a full area of the display screen. An objective lens having a magnification which is equal to the necessary magnification or which is closest to the necessary magnification, but is smaller than the necessary magnification is selected and is automatically indexed into the inspection optical axis. At the same time, a moving amount of the stage is calculated and the stage is automatically moved such that a center point of the desired region comes into a center point of the display screen.

5 Claims, 13 Drawing Sheets

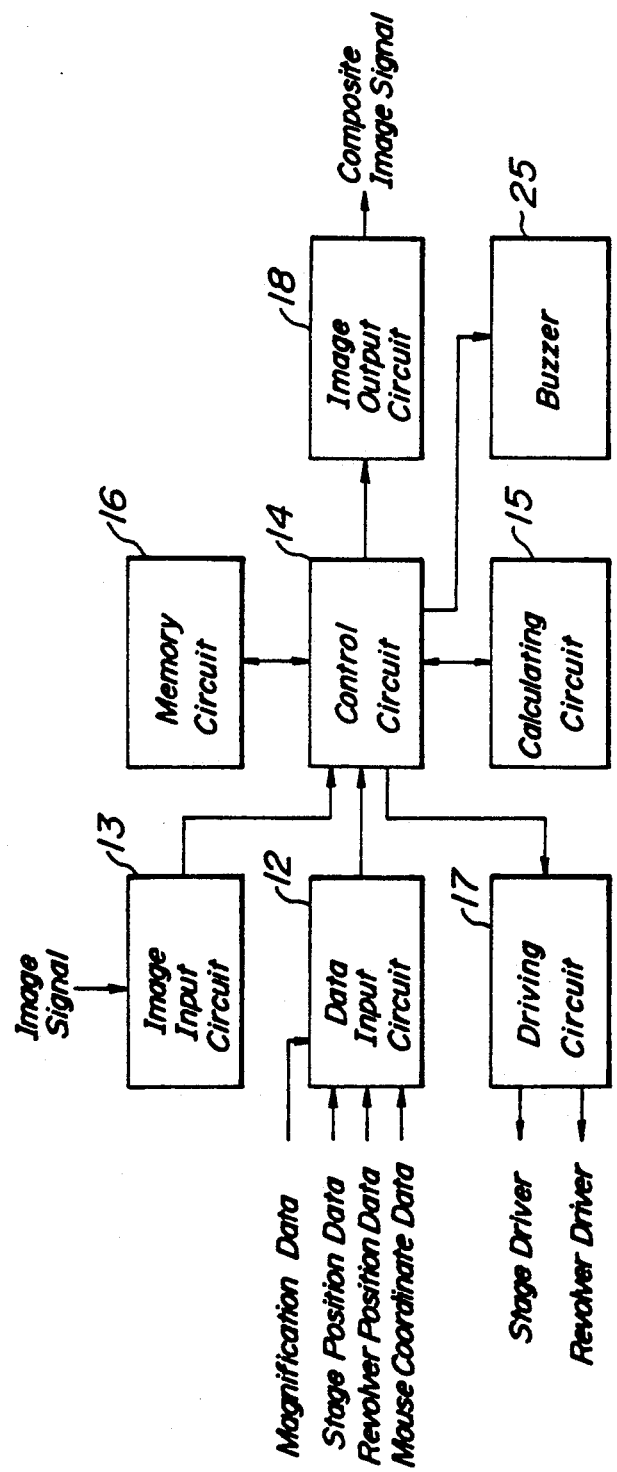

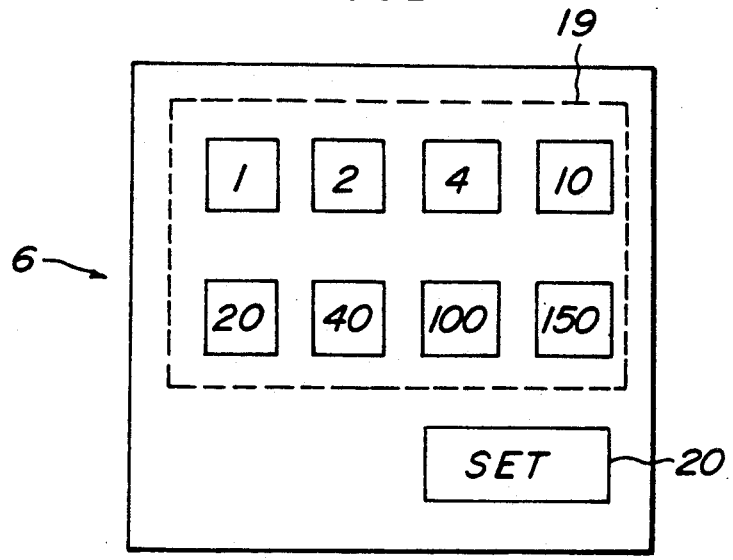
FIG_4
FIG_5
| Hole No. of Revolver | Magnification |
|---|---|
| 1 | x 1 |
| 2 | x 40 |
| 3 | x 100 |
| 4 | x 20 |
| 5 | x 2 |
| 6 | x 10 |

FIG_6
| Hole No. | X | Y |
|---|---|---|
| 1 | 0020 | 0050 |
| 2 | 0050 | 0060 |
| 3 | 0040 | 0070 |
| 4 | 0010 | 0005 |
| 5 | 0080 | 0002 |
| 6 | 0120 | 0006 |
FIG_7A
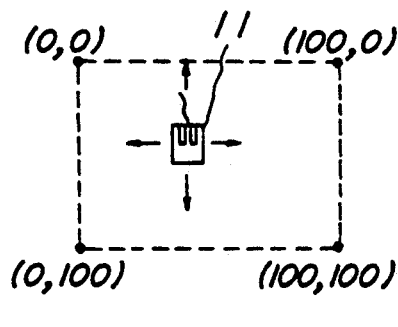
FIG_7B
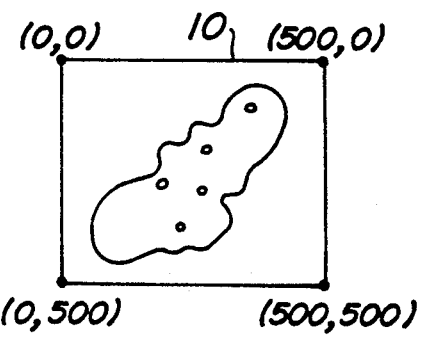
FIG_8
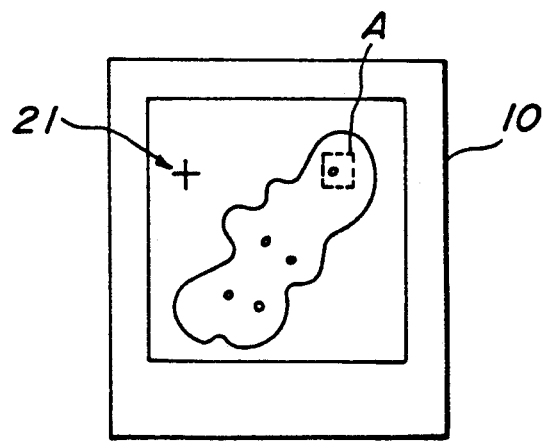

FIG. 9
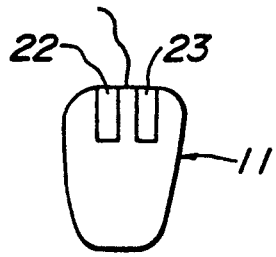
FIG. 10
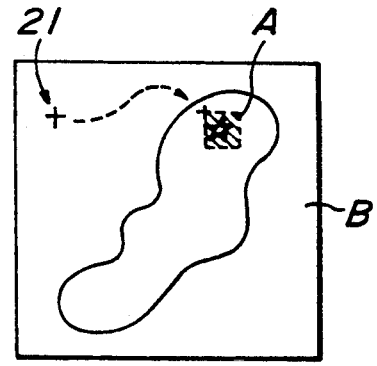
FIG. 12
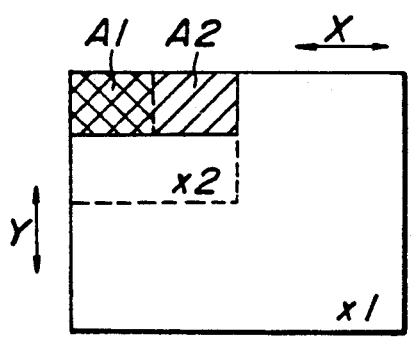
FIG. 11
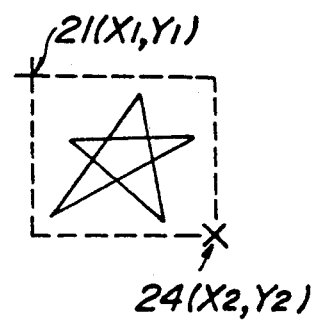
FIG. 13
| Magnification | Correction |
|---|---|
| x1 | 1 |
| x2 | 1/2 |
| x4 | 1/4 |
| x10 | 1/10 |
| x20 | 1/20 |
| x40 | 1/40 |
| x100 | 1/100 |
| x150 | 1/150 |

FIG_15A
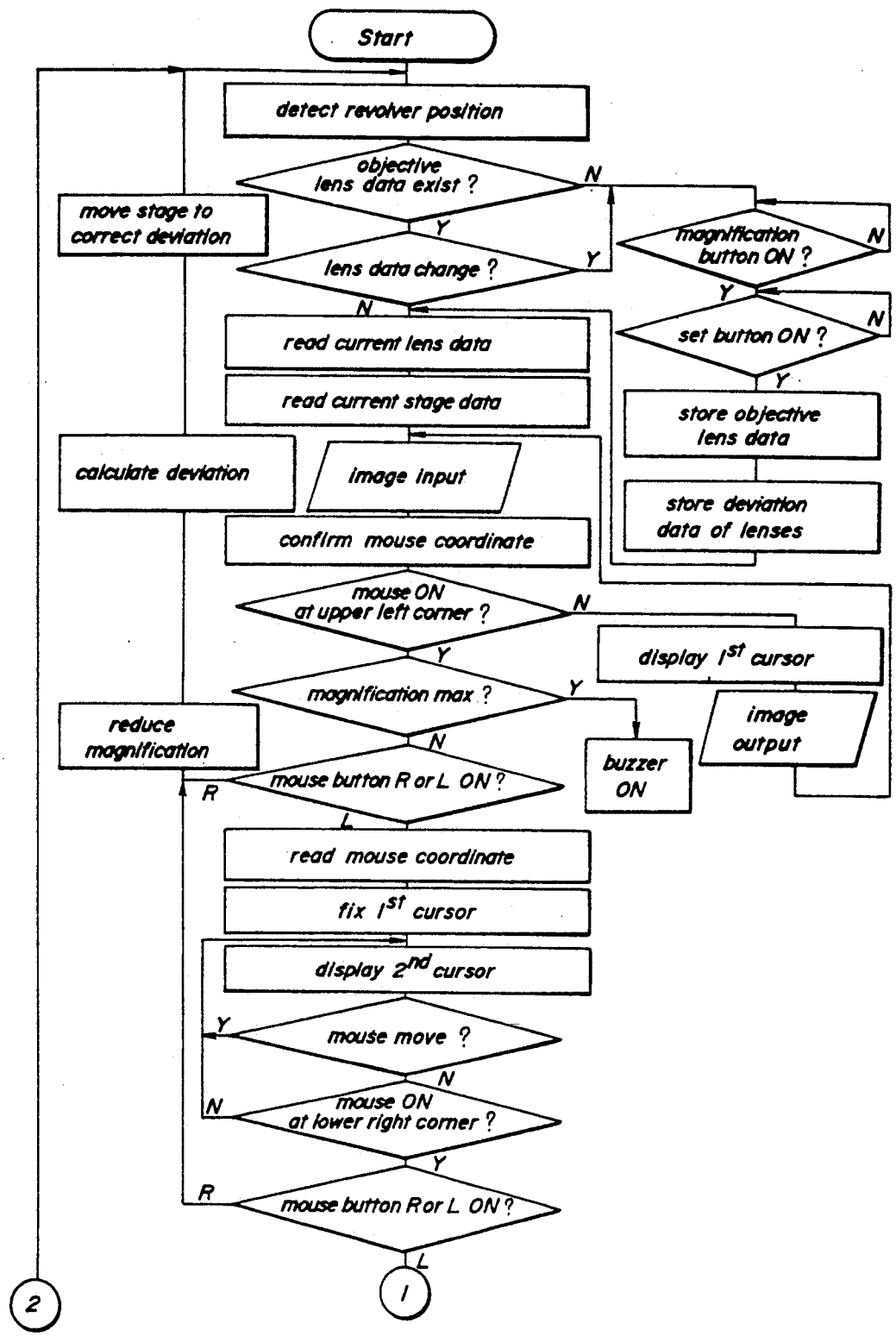

FIG_15B
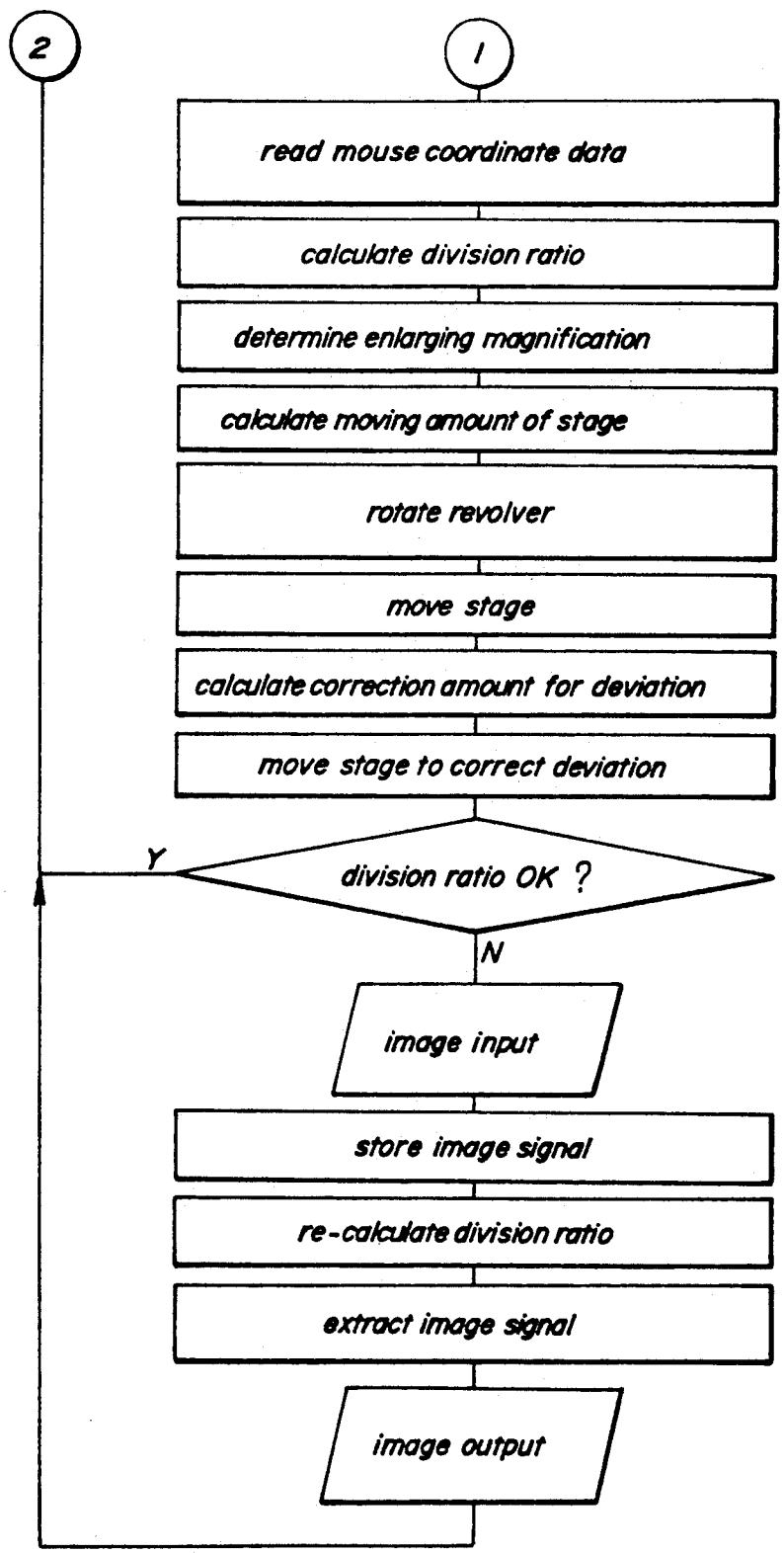

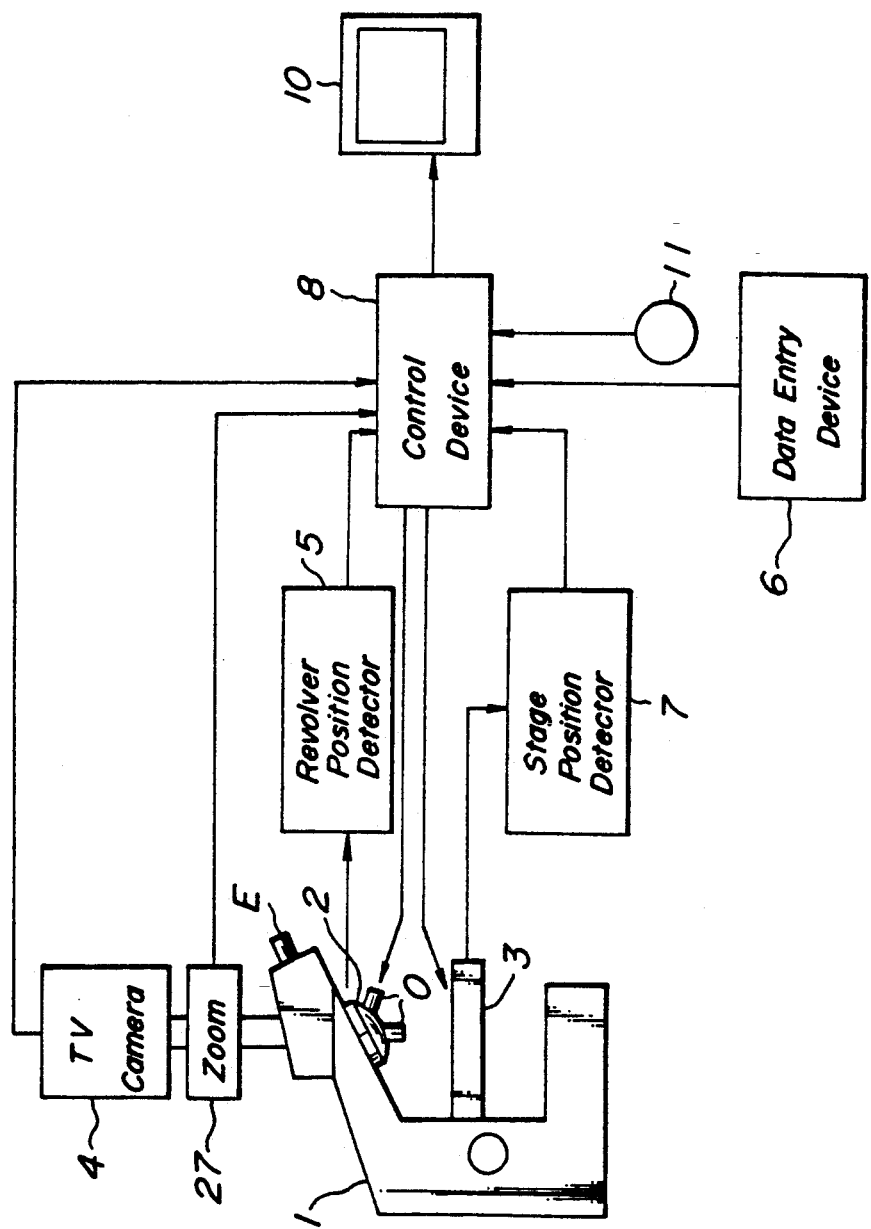

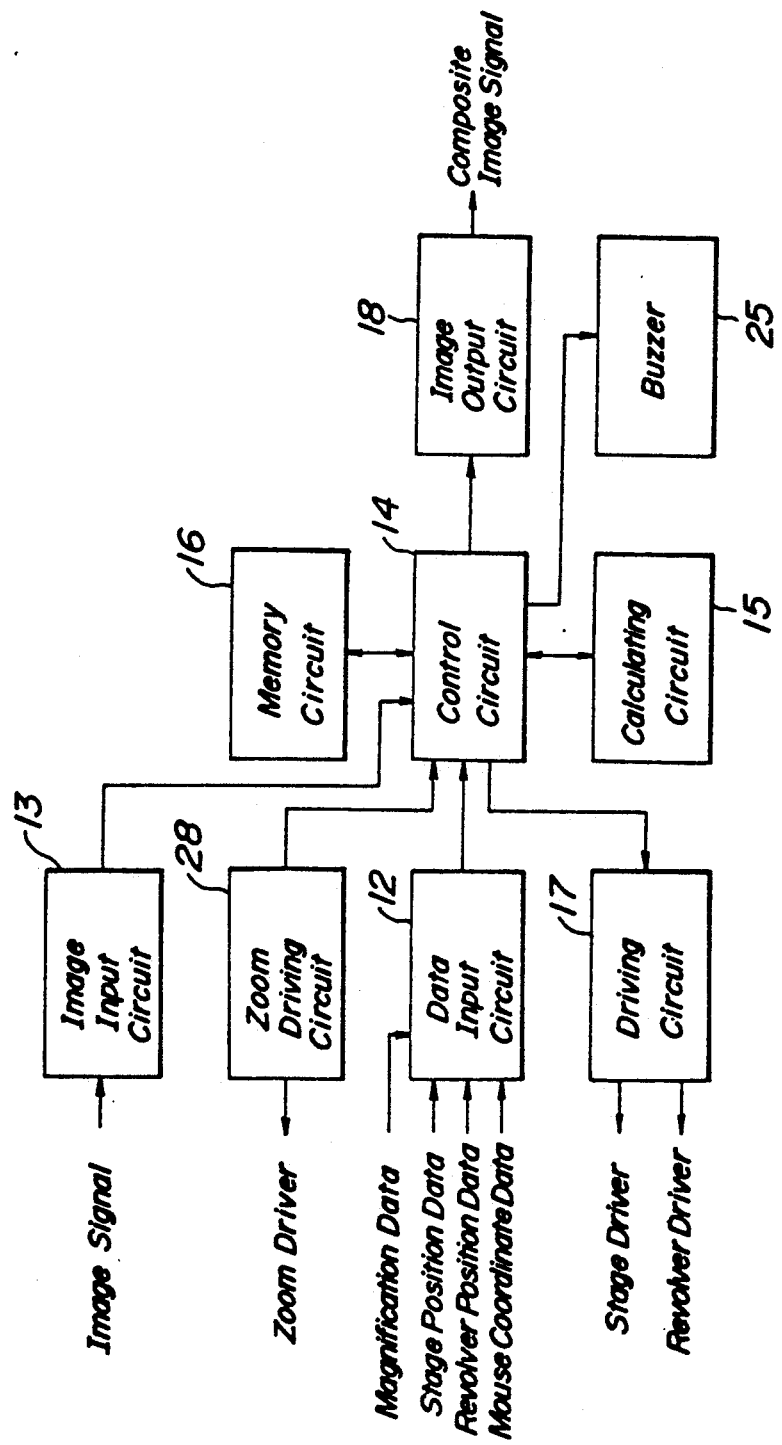

FIG_18A
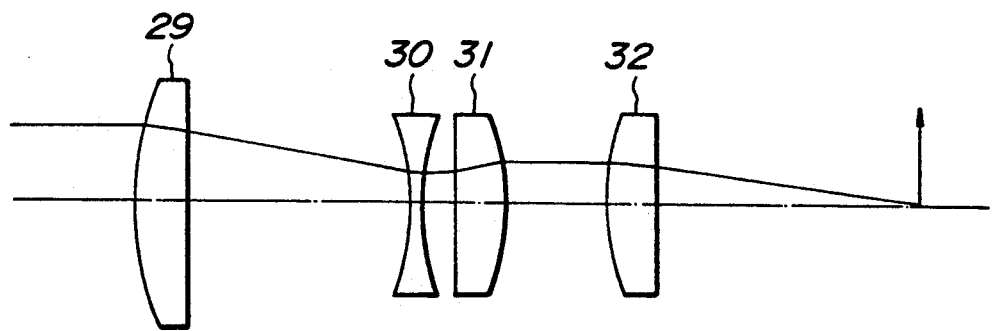
FIG_18B
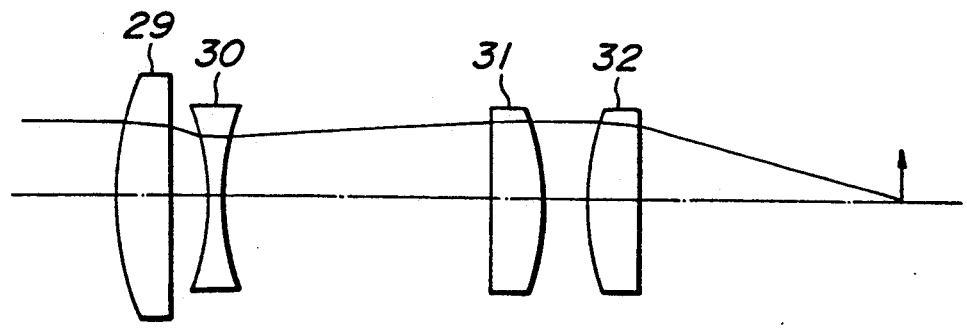

OPTICAL MICROSCOPE WITH VARIABLE MAGNIFICATION

BACKGROUND OF THE INVENTION

1. Field of the Invention and Related Art Statement

The present invention relates to an optical microscope with variable magnification, in which a magnification can be changed by rotating a revolver supporting a plurality of objective lenses having different magnifications such that any objective lens having a desired magnification is selectively indexed into an inspection optical axis, while a stage for holding a specimen to be inspected is moved in a plane perpendicular to the inspection optical axis.

Heretofore, there have been developed various kinds of optical microscopes for inspecting enlarged images of specimens, for displaying enlarged images of specimens on a television monitor screen and for taking photographs of enlarged images of specimens. Such microscopes have been widely used in various fields such as industrial and biological factories and laboratories.

In the known optical microscopes used in the above mentioned fields, a plurality of objective lenses having different magnifications are secured to a revolver which is arranged rotatably to index any one of the objective lenses into the inspection optical axis, so that a magnification of an image of a specimen can be varied. Usually, in case of changing the magnification of the inspected image of the specimen, the condition of illumination of the specimen is changed in response to the rotation of the revolver in order to illuminate the specimen in the most effective manner. Moreover, when a low magnification is changed into a high magnification, in order to avoid that a portion of the specimen to be inspected is removed out of the field of view, before the magnification is changed, the stage must be moved such that said portion to be inspected is situated substantially at a center of the field of view.

However, when all the above mentioned operations are carried out manually by the user, a necessary time for adjusting the microscope is liable to be very long and a time for studying the specimen becomes shortened accordingly.

In Japanese Patent Application Publication Kokai Sho Nos. 59-177507 and 59-177508, there is disclosed a microscope in which the illuminating condition is automatically adjusted in response to the change of objective lenses. In Japanese Patent Application Publication Laid-open Kokai Sho No. 60-118827 and Japanese Utility Model Publication No. 62-32244, there is described another known microscope in which the revolver is rotated by means of an electric motor. Further in Japanese Patent Application Laid-open Kokai Sho No. 60-8816, there is disclosed still another known microscope in which the specimen stage is moved by means of an electromagnetic driving means.

In these known optical microscopes, parts of the operations for handling the microscope are effected with the aid of the electromagnetic driving means. That is to say, the revolver and stage are driven by means of the electric motors. However, in order to move the revolver and stage, the user has to operate switches and the like. That is to say, in the known microscope, the revolver and stage could not be driven automatically.

Therefore, when the magnification is to be changed from a low value into a high value, the operation of the specimen holding stage becomes cumbersome and requires a relatively long time. It should be noted that even though a desired portion of the specimen is moved into the center of the field of view, when the revolver is rotated to index an objective lens having a high magnification into the inspection optical axis, the desired portion could not be seen, because parts of the microscope such as the objective lenses and revolver have errors in precision as well as in assembling, so that desired portion of the specimen might be shifted from the center of the field of view. Therefore, in almost all cases, when the magnification is varied into the high magnification, the stage has to be adjusted precisely.

Moreover, when an enlarged image of a desired portion of specimen under inspection is inspected with the low magnification, it is necessary to select an objective lens having a higher magnitude by visually judging a size of the desired portion of specimen on the basis of the image having a low magnification. Sometimes this results in error in selection of an objective lens and requires high user skill level. If the desired portion of the specimen could not be inspected with a desired magnification, it is necessary to select another objective lens. In this manner, in the known microscope, the operation of changing the magnification becomes very cumbersome.

In Japanese Patent Application Laid-open Kokai Sho No. 64-53157, there is disclosed another known optical microscope in which the operation is improved by automating the inspection of a specimen. In this known microscope, predetermined successive steps for checking a specimen are performed automatically, but it is not possible to inspect a desired portion of specimen with a desired magnification.

SUMMARY OF THE INVENTION

The present invention has for its object to provide a novel and useful optical microscope with variable magnification, in which a desired portion of a specimen can be inspected with a desired magnification in an easy and correct manner without effecting a cumbersome operation for the specimen stage.

According to the invention, an optical microscope with variable magnification comprises:

a main body;

a plurality of objective lenses having different magnifications;

a revolver for supporting said plurality of objective lenses and arranged on the main body rotatably such that any one of said objective lenses can be indexed into an inspection optical axis;

a stage for holding a specimen under inspection and arranged on the main body movably in a plane which is perpendicular to the inspection optical axis;

a monitoring means for picking-up an image of the specimen by means of an objective lens indexed into the inspection optical axis and including a monitor screen on which the picked-up image of the specimen is displayed;

an indicating means for indicating a desired region in the image of the specimen displayed on the monitor screen;

a controlling means for calculating control data which represents a necessary magnification and/or a necessary position of the stage for displaying an image of the specimen within said desired region on the monitor screen with substantially said necessary magnification such that the image of the specimen within the desired region is displayed on substantially a full area of monitor screen; and a driving means for driving said revolver and/or the stage in accordance with said control data calculated by said controlling means such that an objective lens having a magnification which is substantially equal to said necessary magnification is automatically indexed into said inspection optical axis and/or a desired portion of specimen defined by said desired region in the displayed image of the specimen is automatically moved substantially into a central portion of a field of view.

BRIEF DESCRIPTION OF THE DRAWINGS

FIG. 2 is a block diagram showing the construction of the control device shown in FIG. 1;

FIG. 4 is a plan view depicting an embodiment of the data entry device shown in FIG. 1;

FIG. 5 is a diagram showing an embodiment of the data table of the objective lens stored in the memory circuit shown in FIG. 2;

FIG. 6 is a diagram representing an embodiment of a data table of stage coordinate data;

FIGS. 7A and 7B a diagram expressing a positional relation between a movable range of a mouse and the coordinates on the TV monitor;

FIG. 8 is a diagram illustrating an example of an image of a specimen with a cursor displayed on the TV monitor;

FIG. 9 is a plan view showing the construction of the mouse;

FIGS. 10, 11 and 12 are diagrams for explaining the enlarging operation in the first embodiment;

FIG. 13 is a diagram representing an embodiment of a data table of correction coefficients of the stage movement;

FIGS. 15A and 15B are flow charts representing their operation of the microscope shown in FIG. 14;

FIG. 16 is a block diagram illustrating a third embodiment of the microscope according to the invention;

FIG. 17 is a block diagram showing the construction of the control device shown in FIG. 16; and FIGS. 18A and 18B are diagrams showing the construction of an embodiment of the zoom lens of the image pick-up device.

DETAILED EXPLANATION OF THE PREFERRED EMBODIMENTS

Figure 1:
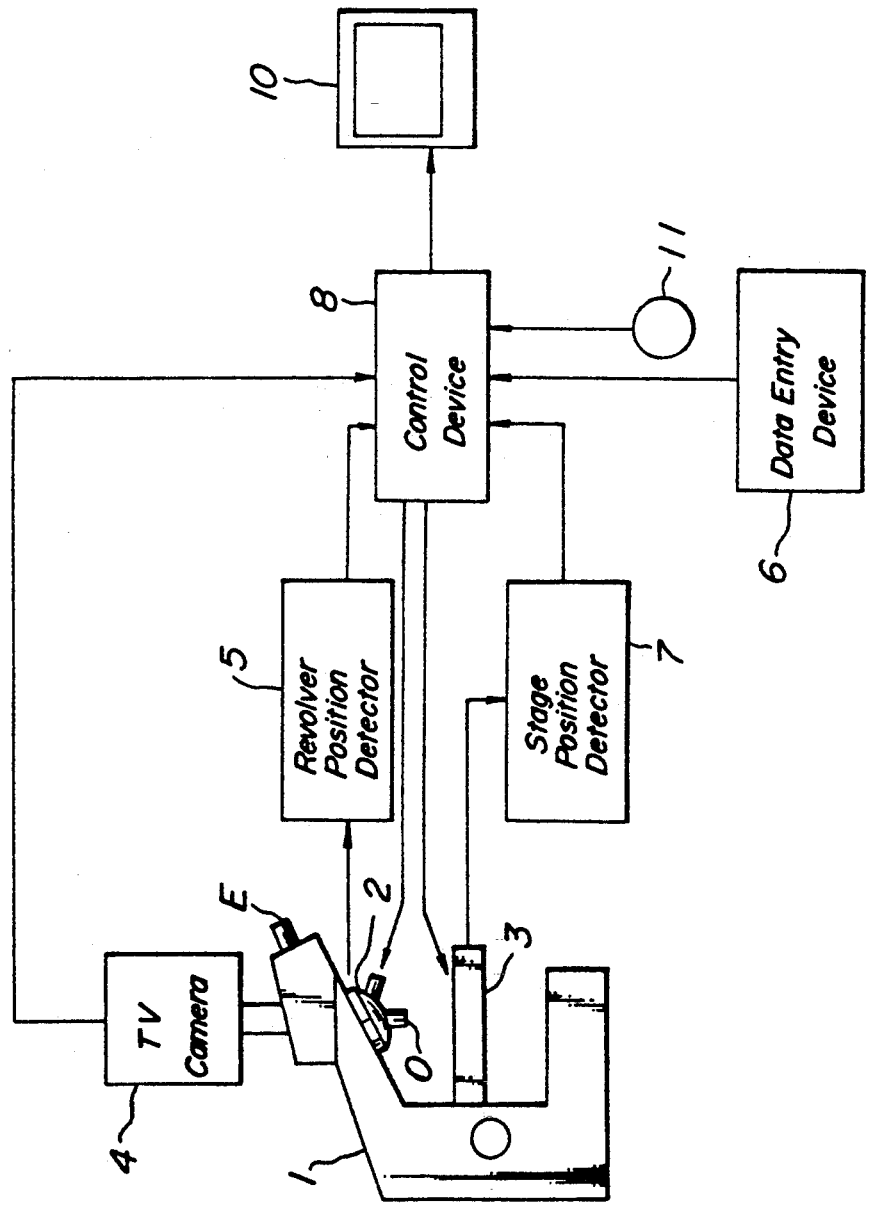
FIG. 1 is a schematic view illustrating a whole construction of the optical microscope according to the invention.

FIG. 1 is a diagram showing the whole construction of a first embodiment of the optical microscope according to the invention. The microscope generally comprises a main body 1, a revolver 2 rotatably secured to the main body for supporting a plurality of objective lenses O having different magnifications, an eyepiece E arranged on the main body 1, and a stage 3 for holding a specimen under inspection. The stage 3 is arranged on the main body 1 movably in an optical axis for adjusting a focus condition as well as in mutually orthogonal X and Y directions in a plane which is perpendicular to the optical axis. On the main body 1 there is further arranged a television camera 4 for picking-up an image of the specimen by means of an objective lens indexed at the inspection optical axis to generate an image signal of the specimen. There are further provided a revolver position detecting device 5 for detecting respective holes formed in the revolver 2 for detachably securing the objective lenses O, a data entry device 6 for entering data about magnifications of the objective lenses O secured to the revolver 2, a stage position detecting device 7 for detecting a position of the stage 3 with respect to the main body 1, a control device 8 for controlling the above mentioned various devices, a television monitor 10 for displaying the image of the specimen picked-up by the television camera 4, and a mouse 11 for moving a cursor displayed on the monitor 10.

FIG. 2 is a block diagram showing the construction of the control device 8 shown in FIG. 1. The control device 8 includes a data input circuit 12 for receiving the revolver position data supplied from the revolver position detecting circuit 5, the stage position data supplied from the stage position detecting circuit 7, the objective lens magnification data supplied from the data entry device 6, and the mouse coordinate data supplied from the mouse 11. The control device 8 further comprises an image input circuit 13 for receiving the image signal supplied from the television camera 4, a control circuit 14 for processing the various data signals supplied from the data input circuit 12 and the image signal supplied from the image input circuit 13, a calculating circuit 15 for effecting predetermined operations for data supplied from the control circuit 14, a memory circuit 16 for storing the objective lens magnification data entered by the data entry device 6 and data to be calculated by the calculating circuit 15, a driving circuit 17 for driving the rotary revolver 2 and specimen stage 3, an image output circuit 18 for generating a composite image signal to be displayed on the monitor 10, and a buzzer 25 for alarming erroneous operation.

Figure 3A:
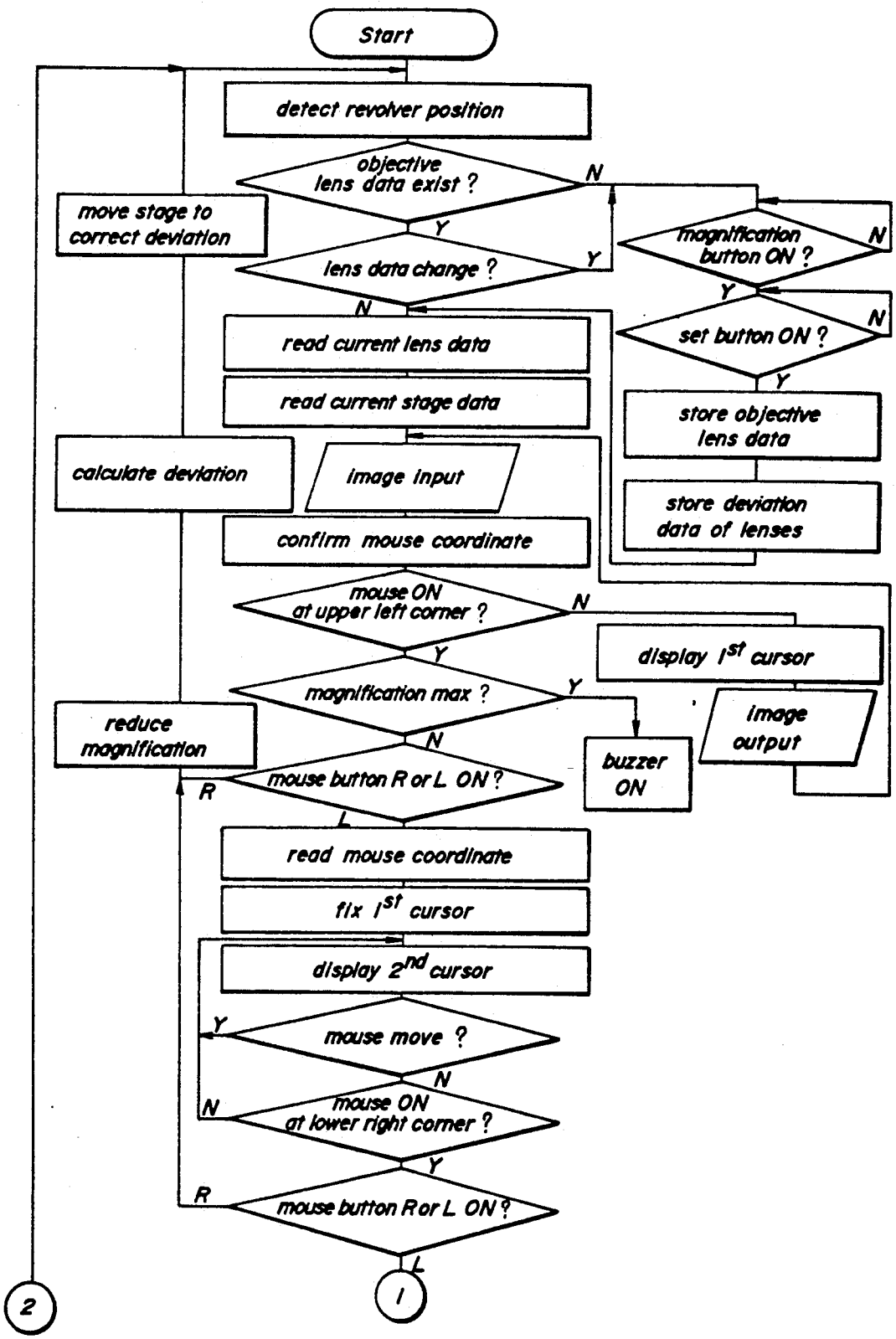
FIGS. 3A and 3B are flow charts explaining the operation of the control device.
Figure 3B:
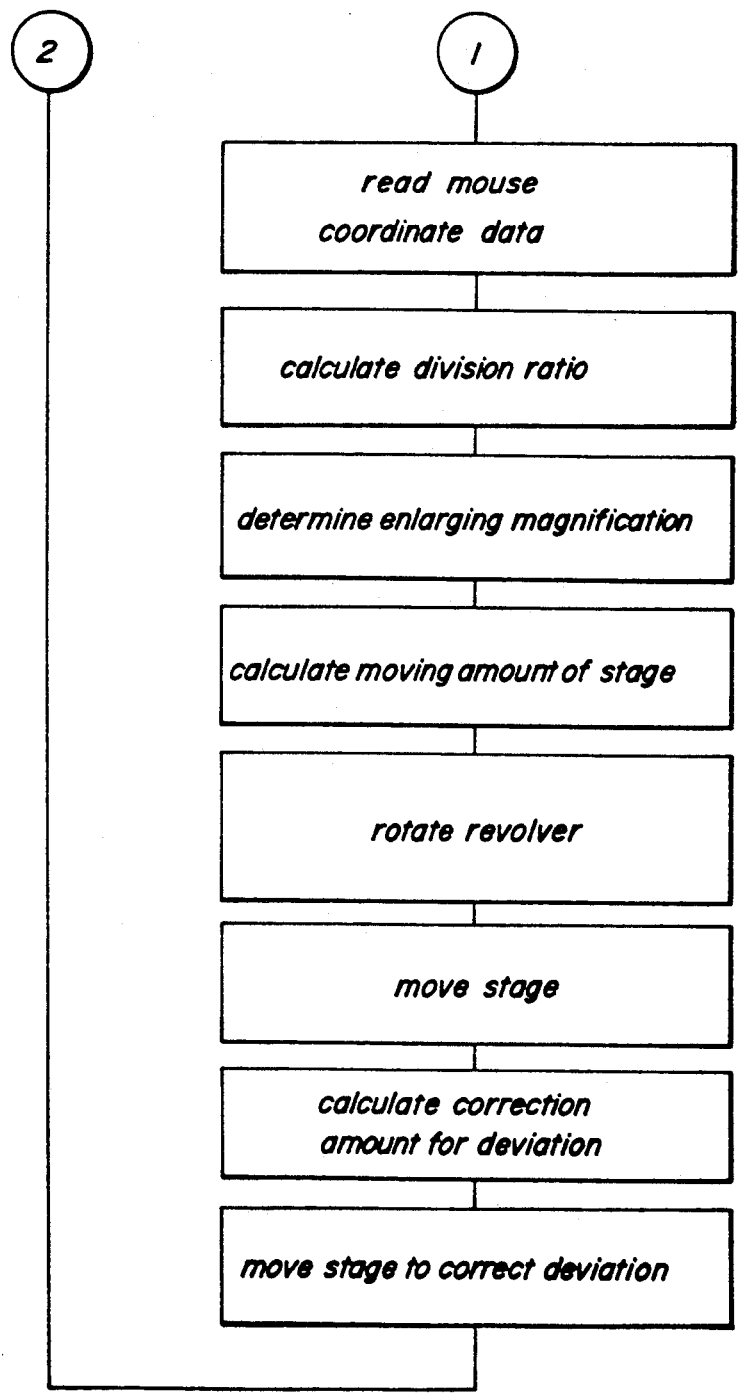

Now the operation of the microscope of the present embodiment will be explained in detail with reference to flow charts shown in FIGS. 3A and 3B.

It is assumed that a plurality of objective lenses O having different magnifications have been set on the revolver 2. When a main power to the microscope is switched on, at first it is judged which objective lens is indexed into the inspection optical axis. This can be effected by detecting the position of the revolver 2 by means of the revolver position detecting circuit 5. That is to say, the revolver position detecting circuit 5 detects a hole in the revolver 2 into which an objective lens indexed into the inspection optical axis is secured and the magnification of the relevant objective lens is read out of the memory circuit 16 in the control device 8.

When data relating to the relevant objective lens has not been stored in the memory circuit 16, the data of the relevant objective lens is entered with the aid of the data entry device 6. As illustrated in FIG. 4, the data entry device 6 comprises a magnification selecting circuit 19 having a plurality of push buttons each having indications of different magnifications, and a set button 20. After the revolver 2 has been rotated such that a desired hole of the revolver is indexed into the inspection optical axis, a magnification select button having an indication which is the same as that of an objective lens secured to the relevant hole of the revolver is pushed, and then the set button 20 is pushed to store the thus entered magnification data in the memory circuit 16 by means of the data input circuit 12 and control circuit 14 of the control device 8. In this manner, in the memory circuit 16 there is formed a magnification data table shown in FIG. 5. In an example shown in FIG. 5, an objective lens having a magnitude of ×1 is secured in the first hole of the revolver 2, an objective lens having a magnification of ×40 is set in the second hole of the revolver, and so on. In this manner, the magnification data of a plurality of objective lenses secured to the holes of the revolver 2 can be stored in the memory circuit 16 of the control device 8.

When the magnification data of the objective lenses O set on the revolver 2 is stored in the memory circuit 16, there is also stored in the memory circuit deviation data representing deviations of optical axes of the objective lenses with respect to a true optical axis. The deviation data can be derived by placing a standard specimen on the stage 3 and the stage is moved such that a reference point on the standard specimen comes into a center of the field of view. Then, coordinate data of the stage 3 is read out by the stage position detecting circuit 7 and is stored in the memory circuit 16 by means of the data input circuit 12 and control device 8 as shown in FIG. 6. The above operation is effected for respective objective lenses on the revolver 2. The deviation data table shown in FIG. 6 indicates that the objective lens secured into the first hole of the revolver 2 has a deviation represented by X coordinate of 0020″ and Y coordinate of 0050″ due to the error in the precision of the objective lens itself and the revolver 2. In this manner, the deviation data of the respective objective lenses can be derived and stored in the memory circuit 16.

The memory circuit 16 has a back-up function, so that even if the electric power is made off, the contents of the memory circuit is not lost. Therefore, the above data storing operation is not necessarily performed each time the electric power is supplied to the microscope. When the objective lens is replaced, it is necessary to perform the above explained operation, so that the magnification data and deviation data of the relevant objective lens is stored in the memory circuit 16.

Then, the control circuit 14 reads current coordinates of the stage 3 by means of the stage position detecting circuit 7 and data input circuit 12, and then receives the image signal generated by the television camera 4 by means of the image input circuit 13. At the same time, the control circuit 14 receives the coordinate signal of the mouse 11 by means of the data input circuit 12. The thus received coordinate signal of the mouse 11 is supplied to the calculating circuit 15 and the coordinates of the mouse are converted into coordinates of a first cursor on the monitor 10. For instance, when the mouse 11 can be moved within a region shown in FIG. 7A and the display screen of the monitor 10 has a wider region illustrated in FIG. 7B, the coordinates of the first cursor can be obtained by multiplying the coordinates of the mouse by five times. That is to say, when coordinates of the mouse 11 are (50, 50), the converted coordinates of the first cursor are (250, 250).

After the coordinates of the mouse 11 have been converted into the coordinates of the first cursor, the control circuit 14 generates a composite image signal of the image of the specimen picked-up by the television camera 4 and the image of the first cursor displayed at a position denoted by the converted coordinates, and the composite image signal thus generated is supplied to the television monitor 10 to display thereon the composite image shown in FIG. 8. In FIG. 8, a reference numeral 21 denotes the first cursor. As illustrated in FIG. 9, the mouse 11 comprises a left hand button 22 and a right hand button 23, and the above mentioned operation for generating the composite image is continued until the left hand button 22 is pushed.

When the mouse 11 is moved up and down as well as right and left, the first cursor 21 is also moved on the monitor screen up and down as well as right and left. By operating the mouse 11 to move the first cursor 21 into any desired point on the image of the specimen displayed on the monitor screen, it is possible to denote a desired region of the specimen which will be displayed in an enlarged manner. Now this operation will be explained.

For instance, if it is desired to display an enlarged image of a region A of the image displayed on the television monitor 10, at first the first cursor 21 is moved into a left upper corner of the rectangular region A as depicted in FIG. 10. Then the left hand button 22 of the mouse 11 is pushed to fix the first cursor 21 at this point. At the same time the X and Y coordinates of the mouse 11 are supplied to the control circuit 14 by means of the data input circuit 12 and the coordinates of the first cursor 21 are stored in the control circuit. It should be noted that the coordinates of the mouse 11 at this moment are represented by $(X_1, Y_1)$.

When the mouse 11 is moved again, on the monitor 10 there is displayed a second cursor 24 as shown in FIG. 11. The control circuit 14 converts coordinates $(X_2, Y_2)$ of the second cursor 24 into the coordinates on the monitor screen on the basis of the coordinates $(X_1, Y_1)$ of the first cursor 21 to display a rectangle shown by a broken line in FIG. 11. That is to say, the first and second cursors 21 and 24 situate at diagonally opposing corner points of the rectangle. Therefore, by moving the mouse 11 up and down as well as right and left, it is possible to change a position as well as a size of the rectangle. When there is formed a rectangle which surrounds the desired region A of the specimen as illustrated in FIG. 11 (in FIG. 11 the desired portion within the region A is represented by a star), the left hand button 22 on the mouse 11 is pushed again. Then, the coordinates $(X_2, Y_2)$ of the second cursor 24 are read in the control circuit 14 by means of the data input circuit 12.

After the coordinates of the first and second cursors 21 and 24 defining the desired region A have been entered into the control circuit 14, the calculating circuit 15 calculates a division ratio of the denoted region A with respect to the whole area B of the display screen of the monitor 10. The calculation of the division ratio is effected independently for X and Y directions, and a larger division ratio is selected as a final division ratio. The reason of such a process will be apparent from the later explanation. Now it is assumed that the maximum value of the display screen are denoted by $(X_0, Y_0)$, the division ratio in the X direction can be calculated by $(X_2 - X_1)/X_0$ and the division ratio in the Y direction can be obtained by $(Y_2 - Y_1)/Y_0$.

After the division ratio has been derived, a desired magnification, in the present example a larger magnification for displaying an enlarged image of the specimen within the denoted region A on a substantially whole area of the display screen of the monitor 10, is determined by the calculating circuit 15. When the objective lens having the magnification of ×1 is inserted into the optical axis, the division ratio in the X and Y directions are ½ and ¼, respectively. Then, a larger division ratio of ½ is selected and the desired enlarging magnification is calculated to ×2.

Now the reason for selecting the larger division ratio will be explained with reference to FIG. 12. When the division ratio in the X direction is ½ and that in the Y direction is ¼, then the region denoted by the rectangle A becomes $A_1+A_2$. If the enlarging magnification is determined on the basis of the smaller division ratio of ¼, then the magnification of an objective lens to be set into the optical axis becomes ×4. Then, only the region $A_1$ will be enlarged and the remaining region $A_2$ will be removed out of the field of view. Therefore, the magnification of the objective lens has to be determined in accordance with a larger division ratio.

When it is impossible to find an objective lens having the magnification which is exactly equal to the desired magnification defined by the division ratio, an objective lens whose magnification is nearest to the desired magnification, but does not exceed the desired magnification is selected. For instance, when the division ratio is 1/12 and the present magnification is ×1, the objective lens having the magnification of ×10 is selected.

After the desired magnification has been determined in the manner explained above, a determination is then made as to an amount of required movement of the stage 3 such that the denoted region A comes into a center point of the field of view. At first coordinates of the center point of the denoted region A are calculated by the calculating circuit 15. The coordinates (X, Y) of the center point of the region A in the X and Y directions can be calculated by $X=(X_2-X_1)/2+X_1$ and $Y=(Y_2-Y_1)/2+Y_1$, respectively.

Then a deviation of the center point of the denoted region A from the center point $(X_0/2, Y_0/2)$ of the display screen is calculated by $X_0/2-X$ and $Y_0/2-Y$.

Next the deviation of the center point of the region A from the center point of the display screen is converted into an amount of movement of the stage 3. It should be noted that the coordinates on the display screen are not changed even if the magnification is changed, but an amount of the movement of stage 3 is changed in accordance with the magnification of the objective lens. Now it is assumed that the coordinates on the monitor screen and the coordinates of the stage 3 are related to each other with 1:1 and the magnification of the current objective lens is ×1 and the desired magnification is ×2, a distance on the image of ×1 becomes longer by two times on the image of ×2. Therefore, it is necessary to calculate a correction ratio of the coordinates on the monitor screen to the coordinates of the specimen stage 3.

In order to calculate the above mentioned ratio, the memory circuit 16 stores a correction data table shown in FIG. 13, said correction data table representing correction coefficients of the movement of the stage for respective objective lenses. The correction coefficients are derived on the basis of the magnification of ×1. A correction coefficient related to a desired magnification is read out of the memory circuit 16 and an actual moving distance of the stage is calculated from the read out correction coefficient and the coordinates on the monitor screen. For instance, when the current objective lens has the magnification of ×2 and the moving distance on the monitor screen is 20″, the correction coefficient of ½ for the magnification of ×2 is read out of the memory 16 and the moving distance is divided by 2 to obtain an actual moving distance of the stage of 10″.

After the desired magnification of the objective lens and actual moving distance of the stage have been determined in the manner explained above, the revolver 2 is rotated to index the objective lens having the desired magnification into the optical axis and the stage 3 is moved in the desired direction over the desired distance. During the movement of the stage 3, the stage coordinate data is read out by the stage position detecting circuit 7 and is supplied to the control device 8, so that the stage movement is effected under the feedback control. The rotation of the revolver 2 is controlled by the control device 8 while the position of the revolver 2 is detected by the revolver position detecting circuit 5 such that the number of pitches of rotation is derived by the control device 8 in accordance with the current magnification and the desired magnification. For instance, when the current magnification is ×40 and the desired magnification is ×2, the revolver 2 is rotated by three pitches.

After the revolver 2 has been rotated to index the objective lens having the desired magnification into the inspection optical axis and the stage 3 has been moved into the desired position, the correction by using the deviation data will be performed. That is to say, the movement of the stage has been effected on the basis of the assumption that the objective lens has no deviation. However, in practice the objective lenses have deviations, so that the optical axis of the objective lens might deviate from the inspection optical axis of the microscope. The deviation data of the previous objective lens and the deviation data of the objective lens having the desired magnification are read out of the memory circuit 16, and a difference therebetween is calculated by the calculation circuit 15. Then the stage is moved by means of the driving circuit 17 in accordance with the calculated difference. For instance, when the current objective lens is set in the second hole of the revolver 2 and has a deviation of X=50, Y=60 and the desired objective lens is secured into the fourth hole of the revolver and has a deviation of X=10, Y=5, the deviation in the X direction is obtained as 10−50=−40 and that in the Y direction as 5−60=−55. Therefore, the stage 3 is moved in accordance with the thus calculated deviation correcting amounts.

In the manner explained above, the objective lens having the desired magnification has been indexed into the optical axis and the stage 3 has been moved into the desired position and the enlarged image of the denoted region A in the original image shown in FIG. 10 can be displayed on the screen of the television monitor 10. Then a new region A can be denoted in the displayed image on the monitor by moving the first cursor 21. In this case, when the objective lens having the maximum magnification is set in the inspection optical axis, it is no longer possible display a further enlarged image, so that when the left-hand button 22 on the mouse 11 is pushed, the alarm buzzer 25 is actuated. When the right-hand button 23 on the mouse 11 is pushed, an objective lens having a magnification which is smaller than that of the current objective lens is indexed into the inspection optical axis. For example, a magnification which is closest to that of the current magnification may be selected. That is to say, when the current objective lens has the magnification of ×40, then the objective lens having the magnification of ×20 is selected. In this case, the stage is moved only for correcting the deviation of the optical axis of the newly indexed objective lens with respect to the inspection optical axis.

As explained above, in the present embodiment, only by denoting a desired region A on the image displayed on the television monitor 10 by operating the mouse 11, an objective lens having a desired magnification for displaying an enlarged image of the denoted region A is automatically selected and is indexed into the inspection optical axis and the stage 3 is automatically moved such that the center point of the desired region A is aligned with the inspection optical axis. Therefore, any possible error in manually selecting the magnification could be removed completely and the cumbersome manual operation for moving the stage can be omitted. In this manner, the optical microscope according to the present invention can be handled very efficiently and simply.

Figure 14:
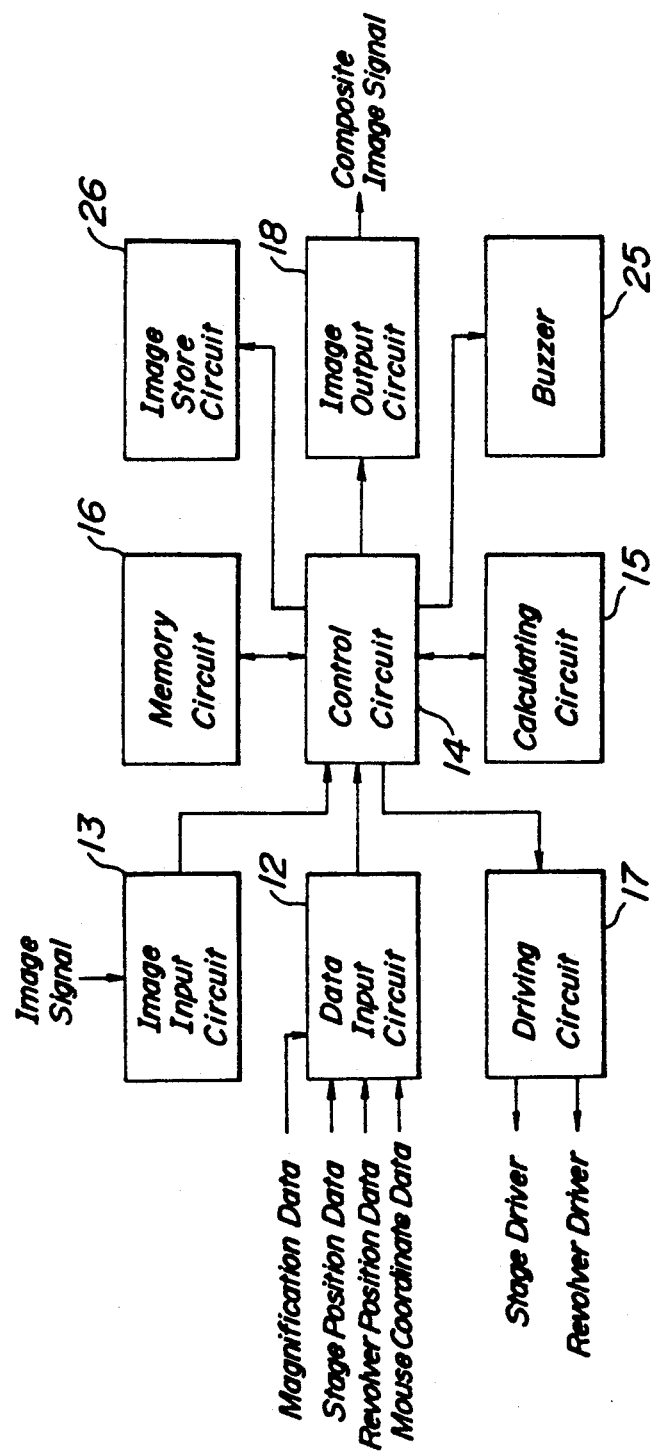
FIG. 14 is a block diagram showing the major construction of a second embodiment of the microscope according to the invention.

FIG. 14 is a block diagram showing the construction of the control device 8 of a second embodiment of the optical microscope according to the invention. In this embodiment, there is provided an image store circuit 26 for storing an image signal of the specimen picked-up by the television camera 8 and supplied by means of the image input circuit 13 and control circuit 14. When the calculated division ratio does not exactly correspond to any one of the magnifications of the objective lenses set on the revolver 2, the enlarging ratio of the image displayed on the screen of the television monitor 10 is corrected in accordance with the calculated division ratio. The remaining construction of the microscope of the second embodiment is same as that of the first embodiment. In the first embodiment, when the calculated division ratio does not correspond to one of the magnifications of the objective lenses arranged on the rotating revolver 2, a nearest lower magnification is selected and an image of the specimen picked-up by the television camera 4 by means of the thus selected objective lens is displayed on the television monitor 10 as it is. However, in the present embodiment, after the nearest lower magnification has been selected, the image picked-up by means of the thus selected magnification is corrected in accordance with the division ratio of the calculated magnification, and the thus corrected image is displayed on the monitor 10.

Now the operation of the microscope of the second embodiment will be explained with reference to flow charts shown in FIGS. 15A and 15B. The operation for a case in which the division ratio of the calculated magnification can be found in the stored magnification table is entirely the same as that of the first embodiment, so that the operation in which the desired magnification is not found in the magnification table will be explained.

Now it is assumed that the current objective lens indexed into the inspection optical axis has the magnification of ×1 and a desired magnification is ×12, but an objective lens having the magnification of ×12 is not set on the revolver 2 and an objective lens having the magnification of ×10 is arranged on the revolver. In this case, the objective lens having the magnification of ×10 is selected. It should be noted that the calculated division ratio of 1/12 means that it is necessary to use an objective lens having the magnification of ×12 for displaying the image having the magnification of ×12 on the full size of the display screen of the monitor 10.

After the rotation of the revolver 2 and the movement of the stage 3 have been completed, the image signal picked-up by the television camera 4 by means of the objective lens having the magnification of ×10 is stored in the image store circuit 26 via the image input circuit 13 and control circuit 14. Next, the division ratio (1/10) obtained by using the thus selected objective lens is compared with the calculated division ratio of 1/12 in the control circuit 14, and the calculating- circuit 15 calculates a percentage of the image displayed on the television monitor 10 with respect to the denoted region A. This calculation can be performed by dividing the calculated division ratio by the actual division ratio, i.e. (1/12)/(1/10). In the above mentioned example, there is obtained 83%.

Then, the control circuit 14 extracts a portion of the image signal stored in the image store circuit 26 such that said portion amounts to 83% of the stored image signal while a center point of the image is identical with a center point of the extracted image. The thus extracted image signal is supplied to the monitor 10 by means of the image output circuit 18. In this manner, it is possible to display the image having the calculated division ratio of 1/12 on the full size of the display screen of the monitor.

In the manner explained above, in the second embodiment, even if the calculated magnification does not correspond to any one of the magnifications of the objective lenses arranged on the revolver, it is always possible to display the image of the specimen with any desired enlarging magnification.

FIG. 16 is a schematic view showing the whole construction of a third embodiment of the optical microscope according to the invention, and FIG. 17 is a block diagram illustrating the construction of the control device shown in FIG. 16. In the third embodiment, there is arranged a zoom lens for continuously varying the magnification between the microscope main body 1 and the television camera 4, and the control device 8 further comprises a zoom driving circuit 28 which varies the magnification of the zoom lens 27 under the control of the control device 8. When the calculated magnification is not found in the magnification data table, the magnification of the zoom lens 27 is adjusted such that the image enlarged with the calculated division ratio can be displayed on the full area of the screen of the television monitor 10. The remaining construction of the third embodiment is the same as that of the first and second embodiments.

Now the operation of the microscope of the third embodiment of the present invention will be explained.

Similarly to the second embodiment, it is assumed that the current objective lens has the magnification of ×1 and the calculated division ratio is 1/12, but there is not provided an objective lens having the calculated magnification of ×12. Then the objective lens having the nearest lower magnification of ×10 is selected and is indexed at the inspection optical axis. Therefore, on the screen of the television monitor 10 there is displayed an image which is larger than the denoted region A in the image having the magnification of ×1. That is to say, the denoted region A occupies only 83% of the full area of the display screen of the monitor 10. In the present embodiment, the calculated division ratio (1/12) is divided by the actual division ratio (1/10) to derive a percentage of the denoted region A with respect to the full area of the monitor screen. Then, the zoom lens 27 is driven under the control of the control circuit 14 by means of the zoom lens driving circuit 28 such that the image having the calculated division ratio of 1/12 is displayed on the screen of the television monitor 10. That is to say, the desired region A is displayed on the full area of the display screen of the television monitor 10.

FIGS. 18A and 18B show the construction of the zoom lens 27. The zoom lens 27 comprises imaging lens 29, variator lens 30, compensator lens 31 and relay lens, said imaging lens and relay lens being fixed, but the variator lens and compensator lens being moved in an optical axis by means of motor driven by the zoom lens driving circuit 28. As illustrated in FIG. 18A, when the variator lens 30 and compensator lens 31 are moved closer to each other, the magnification becomes high, and when these lenses are moved apart from each other as depicted in FIG. 18B the magnification is decreased.

In the third embodiment of the microscope according to the invention, by driving the zoom lens 27 arranged between the main body 1 and the television camera 4 in accordance with the ratio of the calculated division ratio to the actual division ratio, it is possible to display the image having the desired division ratio on the whole screen of the television monitor 10. Upon comparing the third embodiment with the second embodiment, the displayed image has a higher resolution, because in the second embodiment the electrical correction always accompanying the decrease in the resolution is performed, but in the optical correction the decrease in the resolution does not occur.

The present invention is not limited to the embodiments explained above, but many modifications and alternatives can be conceived by those skilled in the art within the scope of the invention. For instance, in the above embodiments the desired magnification and the desired position of the stage are always calculated, but according to the invention it is also possible to calculate only one of them. For instance, when only the desired position of the stage is calculated and the stage is automatically moved, then the magnification can be selected by manually rotating the revolver. Further, it is also possible to select the desired magnification automatically and an objective lens having the desired magnification is automatically indexed into the inspection optical axis. Then, the stage is manually moved into a desired position. Even in such cases, the manual operation of the user can be made simpler than that of the known microscope. Further, in the above embodiments the desired region A to be enlarged is denoted by the mouse 11, but it is also possible to use any kind of coordinate denoting means such as a joystick and a track ball. Further the alarm may be generated not by the buzzer, but also by a display means such as light emitting diodes. Moreover, in the third embodiment, the correction in the magnification is performed by driving the zoom lens arranged between the main body and the television camera, but usually when the microscopic image is picked-up by the television camera, there is arranged a photographic eyepiece. Then, the same function can be attained by changing the magnification of the photographic lens. In this case, it is possible to operate the microscope while the image of the specimen is monitored by providing suitable monitoring means within the field of view of the main body of the microscope.

As explained above in detail, according to the invention, by denoting a desired region on the image of the specimen displayed on the monitoring means, the magnification of an objective lens and/or the position of the specimen stage for displaying the image of the specimen on the full area of the monitor screen are calculated. Then, the desired objective lens is inserted into the inspection optical axis by rotating the revolver and the specimen stage is moved such that the center point of the denoted region becomes identical with the center point of the display screen. Therefore, it is no longer necessary to effect the very cumbersome manual operations of the revolver and specimen stage, so that a desired portion of the specimen can be seen with a desired magnification in a prompt and correct manner, and the operation of the microscope can be performed very efficiently.

What is claimed is:

1. An optical microscope with variable magnification comprising:

a main body;

a plurality of objective lenses having different magnifications;

a revolver for supporting said plurality of objective lenses and arranged on the main body rotatably such that any one of said objective lenses can be indexed into an inspection optical axis;

a stage for holding a specimen under inspection and arranged on the main body movably in a plane which is perpendicular to the inspection optical axis;

a monitoring means for picking-up an image of the specimen by means of one of said objective lenses when it is indexed into the inspection optical axis and including a monitor screen on which the picked-up image of the specimen is displayed;

an indicating means for indicating a desired region in the image of the specimen while it is being displayed on the monitor screen by specifying a region of said monitor screen;

a controlling means, responsive to said indicating means, for calculating control data which represents a necessary magnification and a necessary position of the stage for displaying an image of the specimen within said region on the monitor screen with substantially said necessary magnification such that the image of the specimen within the desired region is displayed on substantially a full area of the monitor screen; and a driving means for driving, in accordance with said control data calculated by said controlling means, (a) said revolver to cause one of said plurality of objective lenses having a magnification which is nearest to but not larger than said necessary magnification to be automatically indexed into said inspection optical axis and (b) said stage so as to be automatically moved to position a desired portion of the specimen defined by said desired region in the displayed image of the specimen substantially into a central portion of a field of view, wherein:

said controlling means comprises a memory circuit, a data entry device for entering into said memory circuit data representing the magnifications of the objective lenses set on the revolver, said memory circuit storing a magnification data table which represents the magnifications of the objective lenses entered by said data entry device, a calculating circuit for calculating the necessary magnification and the necessary position of the stage for displaying the image of the desired region on the full area of the monitor screen, and a control circuit for controlling said data entry device, said memory circuit and said calculating circuit, and said calculating circuit calculates said necessary magnification as a division ratio which is represented by a ratio of an area of the desired region to the full area of the monitor screen.

2. An optical microscope according to claim 1, wherein said controlling means further comprises an image storing circuit for storing an image signal picked-up by said monitoring means and said control circuit extracts a portion of the image signal stored in the image storing circuit in accordance with said division ratio such that the extracted portion of the image signal is displayed on the full area of the monitor screen.

3. An optical microscope according to claim 1, wherein said monitoring means further comprises a zoom lens and said controlling means further comprises a zoom lens driving circuit for varying a magnification of the zoom lens in accordance with said division ratio such that an image of the portion of the specimen having the necessary magnification is displayed on the full area of the monitor screen.

4. An optical microscope according to claim 1, wherein said memory circuit stores a deviation data table which represents deviations of optical axes of the objective lenses set on the revolver with respect to the inspection optical axis, and said control circuit derives an amount of the movement of the stage for correcting a deviation of the objective lens indexed into the inspection optical axis in accordance with said deviation data table.

5. An optical microscope according to claim 1, wherein said controlling means further comprises an alarm device for generating an alarm when an objective lens having a magnification which is substantially equal to the necessary magnification could not be found among the objective lenses set on the revolver.

* * * * *